(12) United States Patent
Kim (10) Patent No.: US 7,722,092 B2
(45) Date of Patent: May 25, 2010

(54) PIPE JOINT DEVICE BY FLANGE

(75) Inventor: Su Gen Kim, Janwoo Officetel No. 320, 339-4 Huam-dong, Yongsan-gu, Seoul 140-901 (KR)

(73) Assignee: Su Gen Kim, Yongsan-gu, Seoul (KR)

( * ) Notice: Subject to any disclaimer, the term of this patent is extended or adjusted under 35 U.S.C. 154(b) by 737 days.

(21) Appl. No.: 10/566,284

(22) PCT Filed: Jul. 22, 2004

(86) PCT No.: PCT/KR2004/001821
§ 371 (c)(1), (2), (4) Date: Mar. 2, 2006

(87) PCT Pub. No.: WO2005/010422
PCT Pub. Date: Feb. 3, 2005

(65) Prior Publication Data
US 2006/0208486 A1    Sep. 21, 2006

(30) Foreign Application Priority Data
Jul. 28, 2003  (KR) ............. 10-2003-0052141
Mar. 26, 2004  (KR) ............. 10-2004-0020596

(51) Int. Cl.
*F16L 21/02* (2006.01)
*F16L 23/00* (2006.01)
(52) U.S. Cl. ............. 285/364; 285/368; 285/373; 285/406; 285/420

(58) Field of Classification Search ......... 285/110–112, 285/364, 406, 413, 420, 223, 365, 367–368, 285/373, 419, 371, 398
See application file for complete search history.

(56) References Cited

U.S. PATENT DOCUMENTS 1,622,768 A * 3/1927 Cook et al. ............. 285/356

(Continued)

FOREIGN PATENT DOCUMENTS

EP    0 987 484    3/2000

(Continued)

*Primary Examiner*—Aaron M Dunwoody
*Assistant Examiner*—Fannie Kee
(74) *Attorney, Agent, or Firm*—K&L Gates LLP (57) ABSTRACT

A pipe joint device using flanges is provided. The pipe joint device includes: flanges mounted to ends of pipes to be coupled together or ends of both a pipe and a pipe joint to be coupled together, the flange having at least one ring groove around an outer circumferential surface thereof; a packing mounted to the flanges and having inner rings around an inner circumferential surface thereof to closely engage with the ring grooves of the flanges; and a clamp having a packing seat to seat the packing therein, with a support sidewall formed by a radial inward extension of each side of the clamp, the clamp being divided into a plurality of clamp parts so that the clamp parts are placed around the packing and are fastened together by a locking member.

12 Claims, 9 Drawing Sheets

U.S. PATENT DOCUMENTS

| | | | | |
|---|---|---|---|---|
| 4,418,948 | A * | 12/1983 | Lew et al. | 285/112 |
| 4,603,885 | A | 8/1986 | Archer | |
| 6,394,507 | B1 * | 5/2002 | Baker | 285/368 |
| 6,450,551 | B1 | 9/2002 | Lee | |
| 6,626,466 | B1 * | 9/2003 | Dole | 285/112 |
| 2001/0052702 | A1 * | 12/2001 | Starita | 285/371 |
| 2005/0127666 | A1 * | 6/2005 | Dole | 285/233 |
| 2006/0284420 | A1 * | 12/2006 | Dole | 285/367 |

FOREIGN PATENT DOCUMENTS

| | | |
|---|---|---|
| KR | 20-0277297 | 6/2002 |

* cited by examiner

PIPE JOINT DEVICE BY FLANGE

FIELD OF THE INVENTION

The present invention relates, in general, to pipe joint devices using flanges and, more particularly, to a pipe joint device using flanges which effectively maintains a jointed state of pipes regardless of an application of impact to the pipes owing to, for example, an earthquake, or regardless of displacement of the pipes due to temperature variation related to climate change.

BACKGROUND

Figure 11:
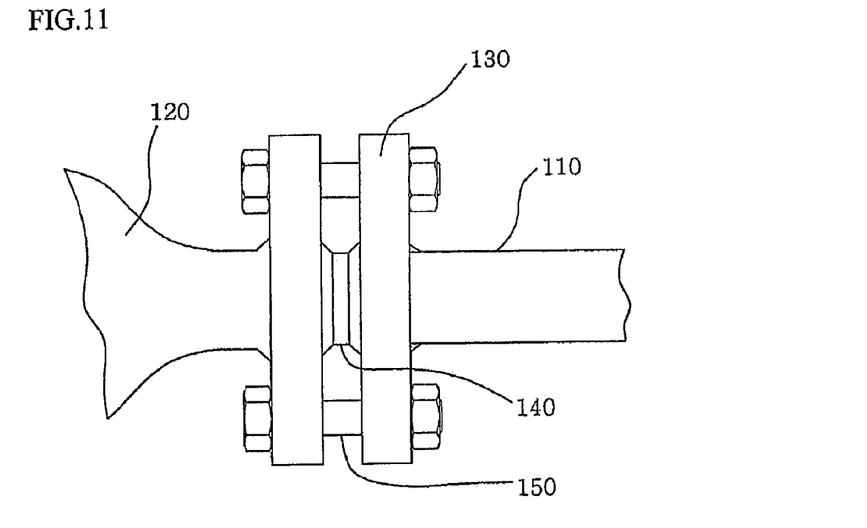
FIG. 11 is a view of a conventional pipe joint device.

Generally, pipe joint devices must firmly joint pipes and need to be easily and simply manipulated by workers on a site. To joint pipes together to provide a pipeline in the related art, pipes having appropriate lengths suitable for being manipulated by workers are arranged along a designed pipeline on a site and are jointed together through a welding process using pipe joints, such as reducers, tees and/or elbows. Furthermore, a valve may be installed in a jointed junction of the pipes when it is necessary to control the flow of fluid passing through the pipeline. Hereinbelow, a conventional technique of jointing a valve to a pipe using flanges will be described with reference to FIG. 11. As shown in the drawing, a flange 130 is welded to each of the pipe 110 and the valve 120, and thereafter, the flange of the pipe is jointed to the flange of the valve using nuts and bolts 150 with a gasket 140 interposed between the two flanges.

The above-mentioned pipe jointing technique is advantageous in that it provides a firmly jointed state of the pipe and valve, but the technique is problematic in that cracks may be formed at the jointed junction to cause leakage of fluid from the junction. Furthermore, when the pipe jointing technique is adapted to a city water supply pipeline, the jointed junctions of the pipeline cannot accommodate displacement of pipes which may occur due to the extension and contraction of the pipes caused by temperature variation owing to climate change, or due to the application of impact to the pipes owing to, for example, an earthquake. Such displacement of the pipes may cause breakage of the pipeline, resulting in leakage and contamination of city water. Furthermore, the conventional pipe jointing technique may cause a gas explosion due to gas leakage when the technique is adapted to a gas pipeline, or may cause a safety accident and the loss of lives when the technique is adapted to a pipeline in a nuclear power plant.

Figure 12:
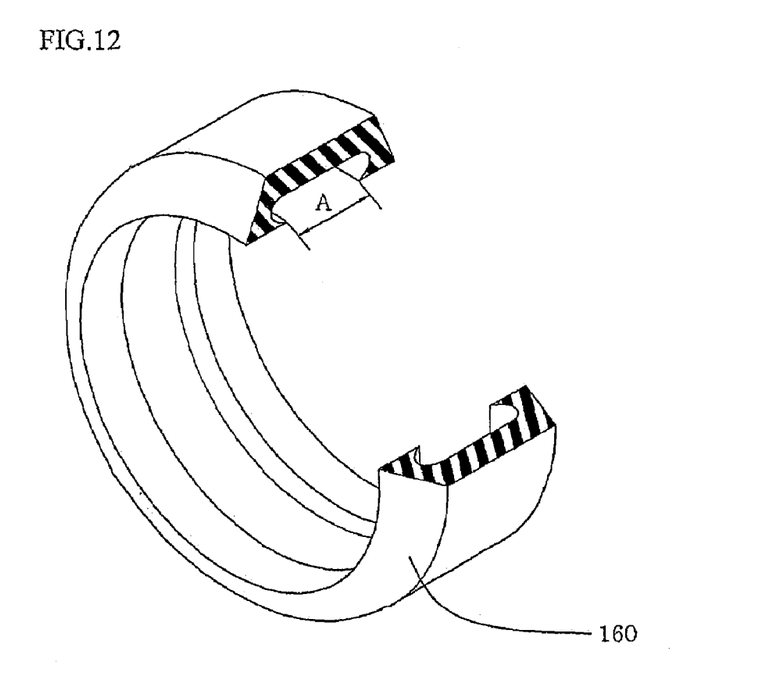
FIGS. 12 and 13 are views of a conventional packing and a pipe joint device using the conventional packing, respectively.
Figure 13:
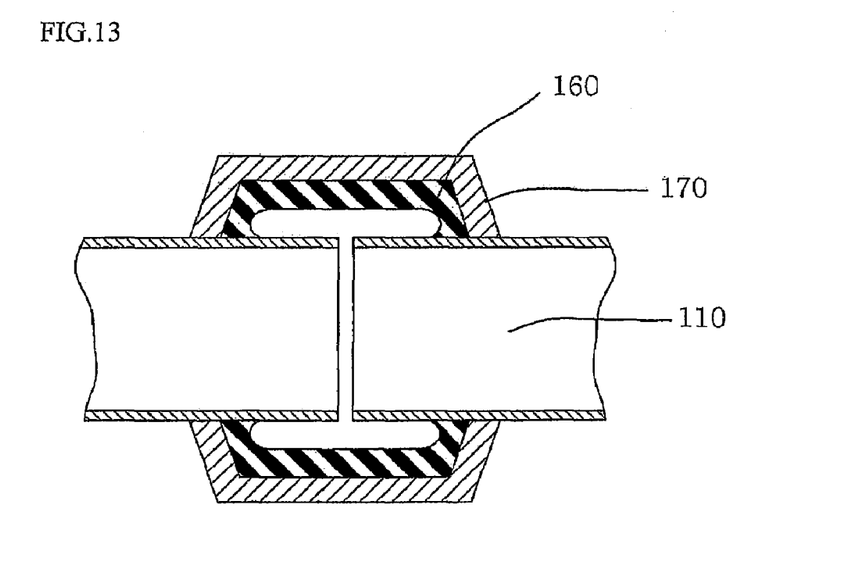

In addition to the above-mentioned pipe jointing technique, another jointing technique using clamps and rubber packings has been widely used. However, this jointing technique is problematic in that jointed pipes may be removed from rubber packings when horizontal or vertical force is applied to the jointed pipes. In an effort to overcome the above-mentioned problem, a packing having an improved structure was proposed, which is provided with a ring-shaped channel along an inner surface thereof as shown in FIG. 12. FIG. 13 shows pipes 110 jointed together using both the above-mentioned packing 160 and a clamp 170. When horizontal force is applied to the jointed pipes to make the interval between the pipes wider, the packing 160 is elastically deformed to widen its channel A, thus maintaining its close contact state relative to the pipes 110. When the horizontal force is removed from the pipes, the packing 160 elastically restores its original shape and returns the pipes to their original positions. The above-mentioned packing having the improved structure is advantageous in that the packing effectively maintains the sealed state of the jointed pipes regardless of an application of external force to the pipes and elastically returns the pipes to their original positions. However, the packing is problematic in that impurities may be deposited in the channel of the packing which could reduce the fluid transmission capacity of a pipeline and cause propagation of bacteria in the channel. Furthermore, the above-mentioned packing is specifically shaped to provide the channel as described above, so that the packing may fail to resist fluid pressure.

SUMMARY

Accordingly, the present invention has been made keeping in mind the above problems occurring in the prior art, and an object of the present invention is to provide a pipe joint device using flanges, which effectively maintains a jointed state of pipes regardless of an application of impact to the pipes owing to, for example, an earthquake, or regardless of displacement of the pipes caused by temperature variation due to climate change.

Another object of the present invention is to provide a pipe joint device using flanges, which is constructed to restore its operational function by being simply processed without being replaced with a new one, even when the pipe joint device becomes worn-out due to lengthy use.

In order to accomplish the above objects, the present invention provides a pipe joint device, comprising: flanges mounted to ends of pipes to be coupled together or ends of both a pipe and a pipe joint to be coupled together, the flange having at least one ring groove around an outer circumferential surface thereof; a packing mounted to the flanges and having inner rings around an inner circumferential surface thereof to closely engage with the ring grooves of the flanges; and a clamp having a packing seat to seat the packing therein, with a support sidewall formed by a radial inward extension of each side of the clamp, the clamp being divided into a plurality of clamp parts so that the clamp parts are placed around the packing and are fastened together by a locking member.

In the pipe joint device of the present invention, the packing may comprise a main channel formed along a central line of an outer circumferential surface of the packing, and the clamp may comprise a central rib formed on the packing seat to correspond to the main channel.

In the pipe joint device of the present invention, the packing may further comprise one or more side channels symmetrically formed around the outer circumferential surface of the packing on opposite sides of the main channel, and the clamp may further comprise one or more side ribs formed on the packing seat to correspond to the side channels.

In the pipe joint device of the present invention, the pipe joint may be selected from the group consisting of a valve, a reducer, a tee and an elbow.

In the pipe joint device of the present invention, the flanges may be mounted to the ends of the pipes or to the ends of the pipe and the pipe joint through a welding process.

In the pipe joint device of the present invention, the flanges may be stopped by the support sidewalls of the clamp so that the pipes or the pipe and the pipe joint are prevented from being removed from the clamp.

In the pipe joint device of the present invention, each of the flanges may be provided with a support groove around the outer circumferential surface thereof so that the support sidewalls of the clamp are seated in the ring-shaped support grooves of the flanges to prevent the pipes or the pipe and the pipe joint from being removed from the clamp.

In the pipe joint device of the present invention, the packing may have at least one circumferential hollow therein.

In the pipe joint device of the present invention, the circumferential hollow may comprise two or more circumferential hollows which are symmetrically formed in opposite sides of the packing.

The pipe joint device of the present invention may further comprise an anti-friction member made of metal and covering a whole area or a part of the outer circumferential surface of the packing to reduce friction between the clamp parts and a deformed part of the packing while the clamp parts are fastened together around the packing.

The pipe joint device of the present invention may further comprise an adjusting member inserted into each of the support sidewalls of the clamp to compress the packing, placed between the support sidewalls of the clamp, in a direction of thickness of the packing.

The pipe joint device of the present invention may further comprise a metal ring placed between each side surface of the packing and an associated support sidewall of the clamp to evenly transmit compression force to each side surface of the packing when the adjusting member is tightened to compress the packing.

According to the present invention, a flange having a ring groove is mounted on an end of each pipe, and thereafter, the pipes having the flanges are jointed together using a packing and clamps. Thus, the pipe joint device effectively maintains the jointed state of the pipes regardless of an application of impact to the pipes owing to, for example, an earthquake, or regardless of displacement of the pipes caused by temperature variation due to climate change. The pipe joint device also elastically returns the pipes to their original positions when the external force is removed from the pipes. Thus, the pipe joint device prevents breakage of a jointed junction of pipes and thereby prevents leakage of fluid from the jointed junction.

Furthermore, the packing and clamps have channels and ribs, respectively, so that the clamps more effectively hold the packing. Thus, the operational function caused by engagement of the inner ring of the packing with the ring groove of the flange is enhanced.

The packing has a circumferential hollow therein, thus increasing the flexibility thereof to be more easily deformed and more easily restore its original shape. Due to the circumferential hollow in the packing, the operational function of an adjusting member is enhanced.

Furthermore, it is preferred to shape the packing and the clamps such that the size of the clamps is smaller than the packing so as to allow the inner ring to be in closer contact with the ring groove. In this case, an anti-friction member made of metal and having a smooth surface is preferably used to allow the clamps to be easily fastened together.

In addition, when the operational function of the pipe joint device is reduced due to lengthy use, it is possible to restore the operational function of the pipe joint device to some extent by tightening the adjusting member. When a plurality of adjusting members is provided on the pipe joint device, the above-mentioned effect is enhanced. Furthermore, as a metal ring is provided in the pipe joint device, the compression force can be evenly applied from the adjusting members to the sidewalls of the packing when the adjusting members are tightened to compress the packing.

Additional features and advantages are described herein, and will be apparent from, the following Detailed Description and the figures.

DETAILED DESCRIPTION

Figure 1:
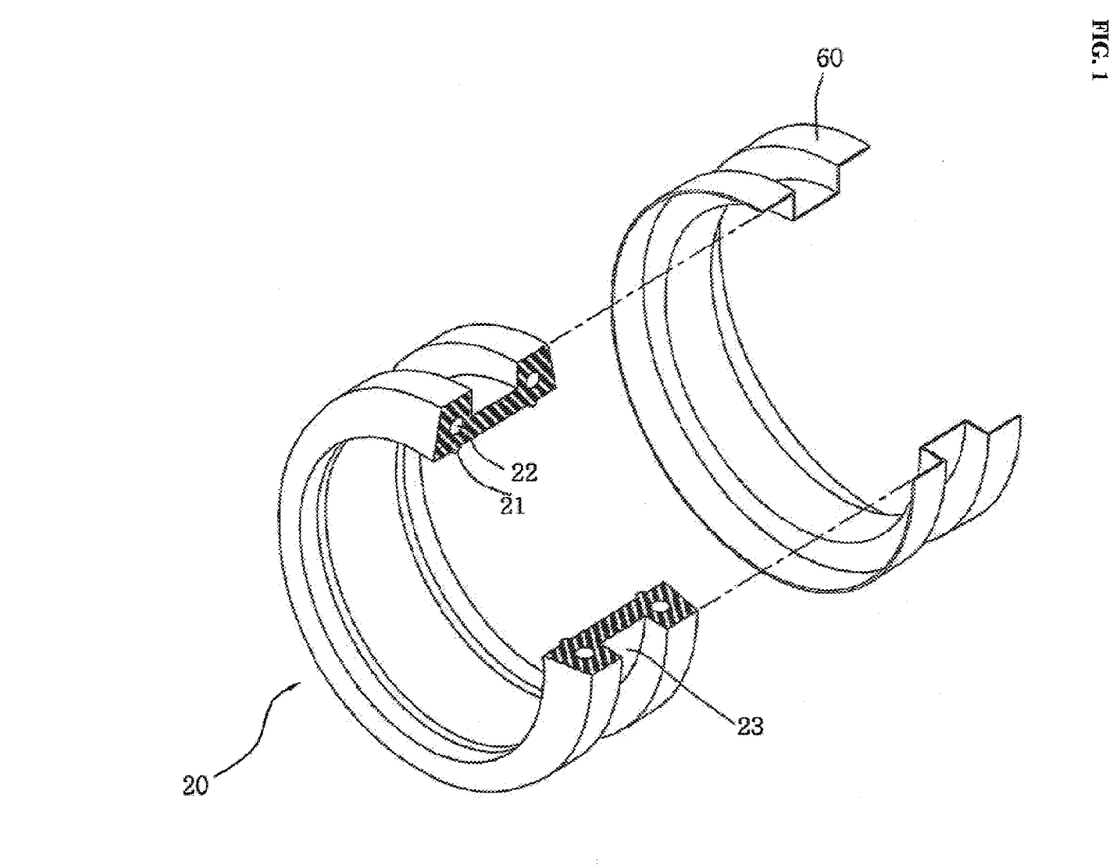
FIG. 1 is a partially broken, exploded perspective view of a packing according to an embodiment of the present invention.
Figure 2:
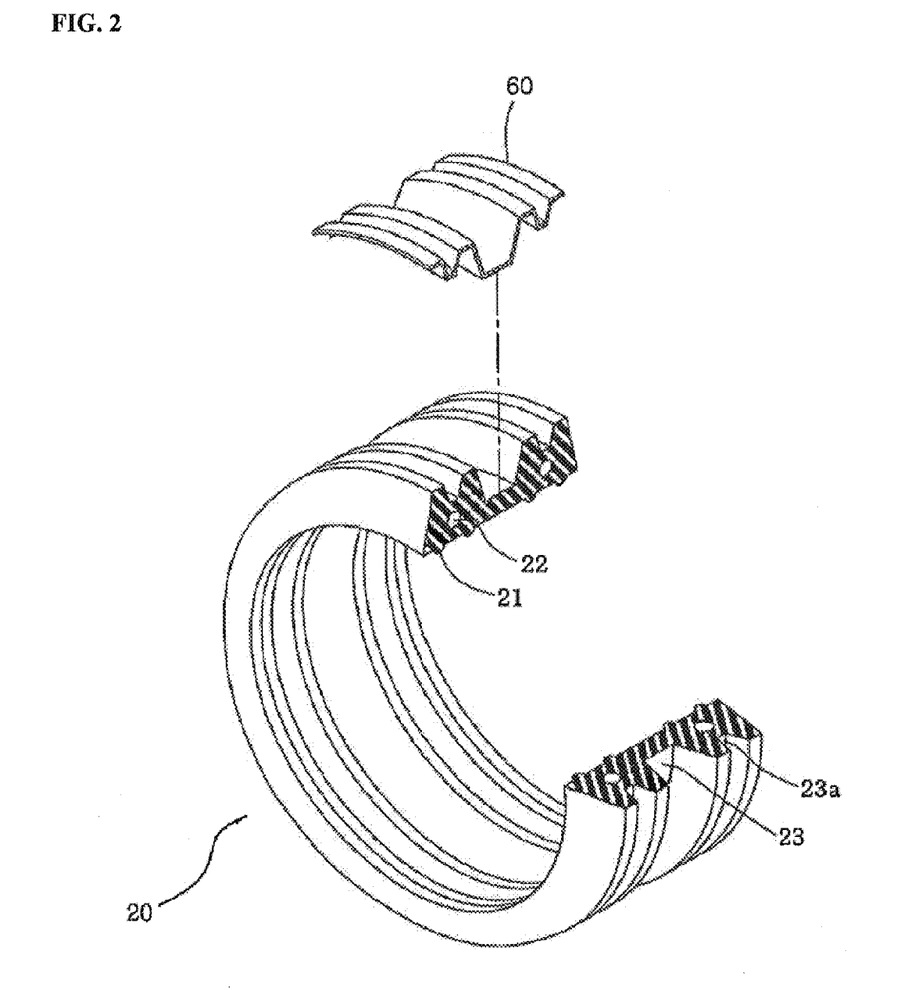
FIG. 2 is a partially broken, exploded perspective view of a packing according to another embodiment of the present invention.

As shown in FIGS. 1 and 2, a packing according to the present invention is constructed as follows. The packing 20 according to the present invention comprises a main channel 23 or a combination of a main channel 23 and a side channel 23a, which is formed around an outer circumferential surface of the packing 20. The side channel 23a may comprise one or more side channels symmetrically formed around the outer circumferential surface of the packing 20 on opposite sides of the main channel 23. The packing 20 further comprises a circumferential hollow 22 and an inner ring 21. The inner ring 21 is formed around an inner circumferential surface of the packing 20 to closely engage with a ring groove 12 of a flange. The circumferential hollow 22 may comprise a single hollow, which has an elliptical cross-section and is formed along a center circumferential axis of the packing 20, or two or more hollows which are symmetrically formed in the packing 20 while extending along opposite sides of the center circumferential axis. Of course, the size of the circumferential hollow 22 may be variously changed according to the size of the packing 20 and other design factors. In addition, the inner ring 21 may comprise two or more rings symmetrically placed on opposite sides of the inner surface of the packing 20. Alternatively, the packing 20 may be configured without an inner ring as will be described later herein because the operational effect expected from engagement of the ring groove 12 of the flange with the inner ring 21 of the packing 20 can be accomplished only by the ring groove 12 of the flange during the engagement of the packing 20 with the flange.

In the present invention, an anti-friction member 60 made of metal covers the circumferential outer surface of the packing 20. The anti-friction member 60 may cover the whole area or a part of the outer circumferential surface of the packing 20. In that case, the phrase "the covering of the anti-friction member 60 on a part of the packing 20" means that the anti-friction member 60 covers only a deformed part 24 which is formed on the packing 20 when clamps 30 are fastened together around the packing 20. The anti-friction member 60 may be fastened to the packing 20 through a variety of fastening methods, for example, a fastening method using an adhesive. Particularly, when the anti-friction member 60 is designed to cover only the deformed part 24 of the packing 20, the anti-friction member 60 may be conveniently fastened to the packing 20 by force-fitting the anti-friction member 60 over the packing 20. In the meantime, when the anti-friction member 60 is designed to cover the whole area or most of the outer circumferential surface of the packing 20, the anti-friction member 60 may be cut to form a discontinuous ring shape which allows the anti-friction member 60 to be easily fitted over the packing 20. Furthermore, when the anti-friction member 60 is used with a packing 20 which has the main channel 23 or the combination of the main channel 23 and the side channel 23a as shown in the drawings, the anti-friction member 60 must have a shape corresponding to the shape of the packing 20. In that case, the anti-friction member 60 can be easily fastened to the whole area or a part of the outer circumferential surface of the packing 20 by fitting the anti-friction member 60 over the packing 20 while aligning the uneven surface of the anti-friction member 60 with the uneven surface of the packing 20.

Figure 3:
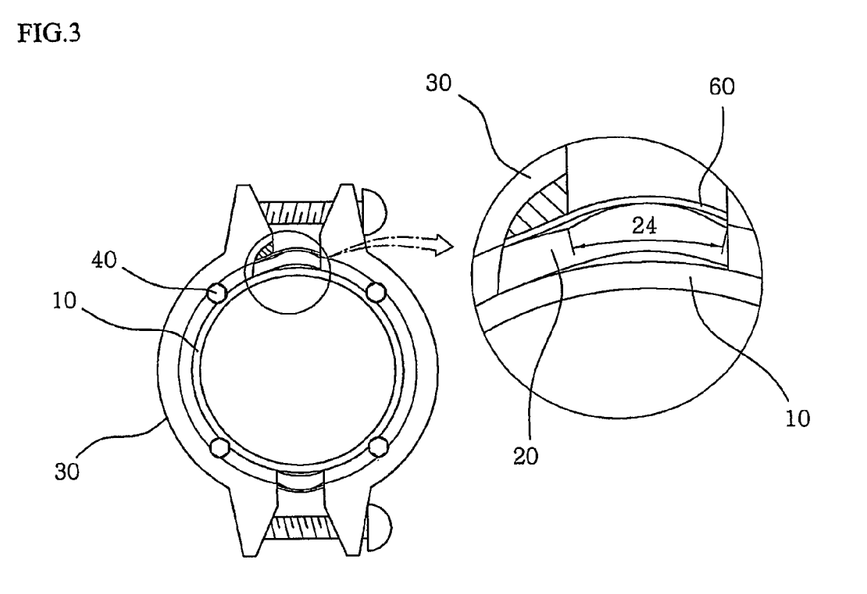
FIG. 3 is a side view of a pipe joint device according to the present invention, which is in a state of jointing pipes together.

The operation of the anti-friction member 60 will be described hereinbelow with reference to FIG. 3. When the clamps 30 are placed around the packing 20 and are fastened together by locking members 34, the packing 20 is deformed to make the deformed part 24. High friction is generated at the junctions between the deformed part 24 and the clamps 30 so that it is very difficult to fasten the clamps 30 together around the deformed part 24 using the locking members 34. Particularly, the packing 20 is made of rubber that generates high friction due to its intrinsic properties, so that execution of the pipe jointing work is very difficult due to the deformed part 24. However, when the anti-friction member 60 covers the deformed part 24, the clamps 30 may be easily fastened together by the locking members 34 regardless of the deformed part 24. Thus, in the present invention, the anti-friction member 60 covers the whole area or a part of the outer circumferential surface of the packing 20. Particularly when the anti-friction member 60 is designed to cover a part of the outer circumferential surface of the packing 20, the anti-friction member 60 may comprise a plurality of members that are placed at the junction of the clamps 30 where the clamps 30 are fastened together. Alternatively, the anti-friction member 60 may comprise a single member that is placed at the junction of the clamps 30.

Figure 4:
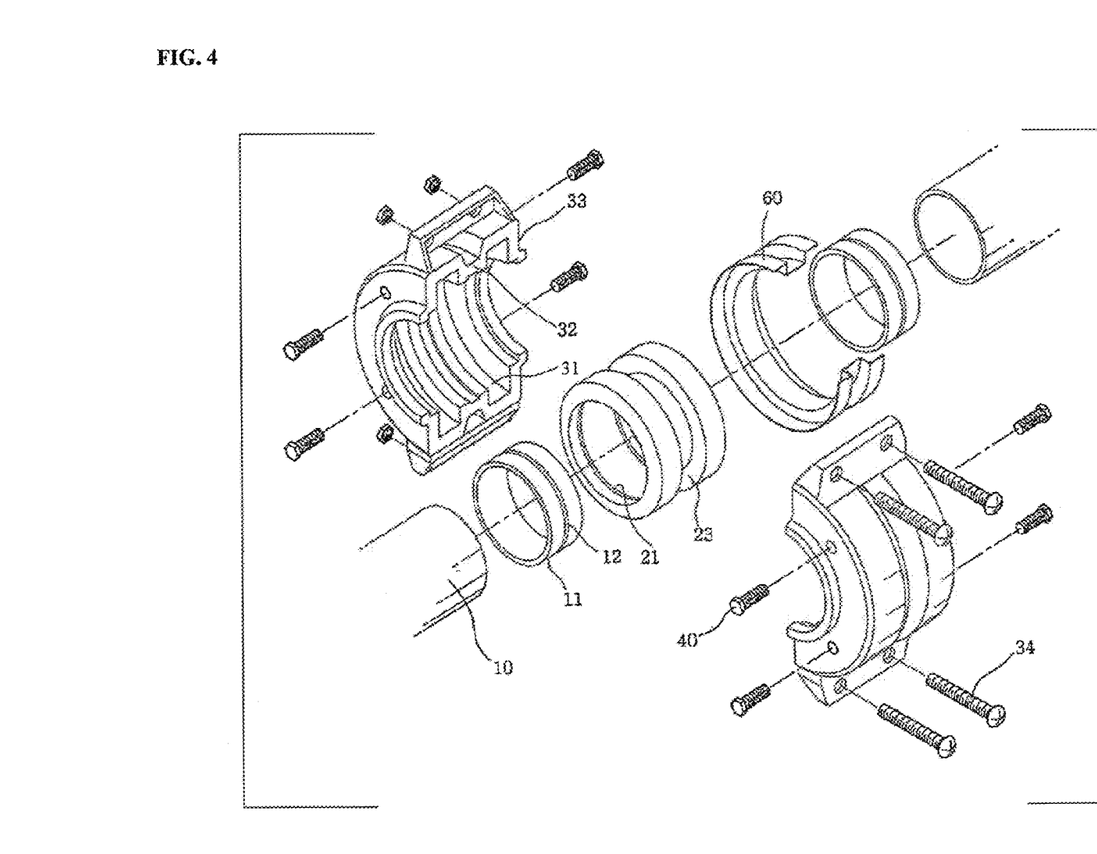
FIG. 4 is an exploded perspective view of a pipe joint device having the packing of FIG. 1.

FIG. 4 shows the construction of a pipe joint device having the packing and the anti-friction member of FIG. 1. As shown in the drawing, the pipe joint device of the present invention comprises two flanges 11, the packing 20, the clamps 30 and adjusting members 40.

The two flanges 11 are fixed to the outer surfaces of the ends of pipes 10 through, for example, a welding process. A ring groove 12 is provided around the outer circumferential surface of each of the two flanges 11. When the flanges 11 are used with a packing that does not have any inner ring 21, the ring grooves 12 of the flanges 11 are brought into close contact with the inner circumferential surface of the packing 20. However, if the flanges 11 are used with a packing having inner rings 21, the ring groove 12 of each flange 11 closely engages with the associated inner ring 21. Thus, when the flanges 11 are used with the packing 20 having inner rings 21, the number and intervals of the ring grooves 12 of the flanges 11 must be designed to correspond to those of the inner rings 21 of the packing 20.

In the present invention, ring grooves may be formed around the outer circumferential surface of the ends of the pipes 10. In that case, the pipes 10 may be jointed together without using the flanges, so that the ends of the pipes 10 having the ring grooves are directly inserted into opposite ends of the packing 20 to achieve the operational effect expected from the use of the flanges.

The packing 20 and the anti-friction member 60 of the present invention are configured as described above. In the above-mentioned embodiment, two inner rings 21 are formed around the inner circumferential surface of the packing 20 because the flanges 11 which are placed in the packing 20 each have one ring groove 12.

Each of the clamps 30 has a packing seat 31 along an inner surface thereof. Both sides of each clamp 30, which define the packing seat 31 between them, extend inwards in radial directions to form support sidewalls 33, the inner diameter of which is smaller than the diameter of the packing seat 31. The support sidewalls 33 of the clamps 30 stop the outside ends of the flanges 11 so that the pipes 10 are not undesirably removed from the packing 20 or the clamps 30. The packing seat 31 is provided with a central rib 32 which is formed along the packing seat 31 to engage with the main channel 23 of the packing 20. In the present invention, the pipe joint device has two or three clamps 30 having the same shape formed by dividing a circular clamp body into two or three parts at the same angular intervals. The clamps 30 are placed around the packing 20 and are fastened together by the locking members 34, such as nuts and bolts, thus jointing the pipes 10 together.

The adjusting members 40 comprise setscrews that are threaded into the support sidewalls 33 of the clamps 30 to be tightened or loosened by workers.

Figure 5:
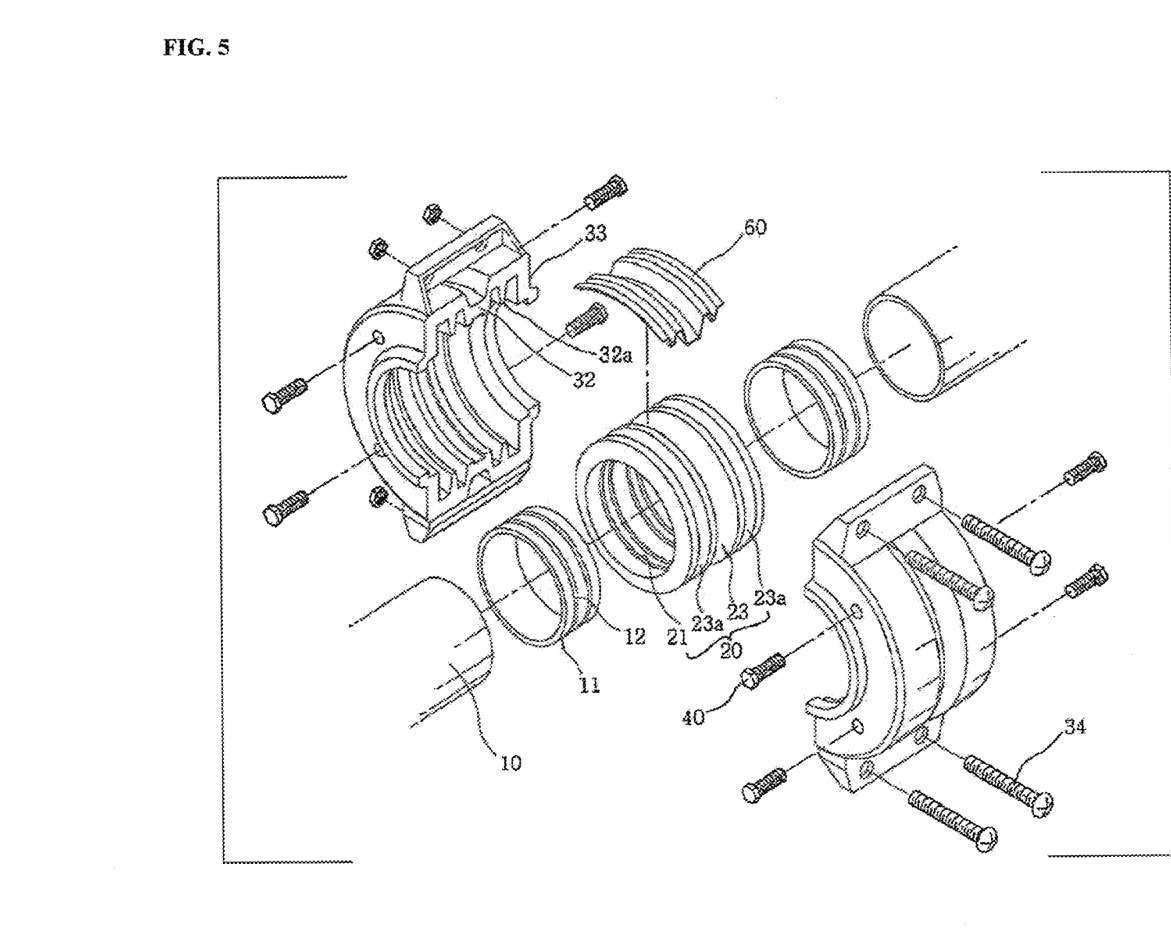
FIG. 5 is an exploded perspective view of a pipe joint device having the packing of FIG. 2.

FIG. 5 shows the construction of a pipe joint device having the packing and the anti-friction member of FIG. 2. As shown in the drawing, the pipe joint device of this embodiment comprises side channels 23a as well as the main channel 23 on the outer circumferential surface of the packing 20, unlike the embodiment of FIG. 4. The side channels 23a are formed on opposite sides of the main channel 23. To correspond to the structure of the packing 20, each of the clamps 30 is provided with side ribs 32a which are formed along the packing seat 31 on opposite sides of the central rib 32 to engage with the side channels 23a of the packing 20. Furthermore, each of the two flanges 11 has two ring grooves 12 so that four inner rings 21 are formed along the inner circumferential surface of the packing 20 so as to correspond to the four ring grooves 12 of the two flanges 11. The anti-friction member 60 according to this embodiment has a smaller surface area than that of FIG. 4 so that the anti-friction member 60 covers only the deformed part 24 of the packing 20. The remaining elements of the pipe joint device of this embodiment are the same as those of FIG. 4.

Figure 6:
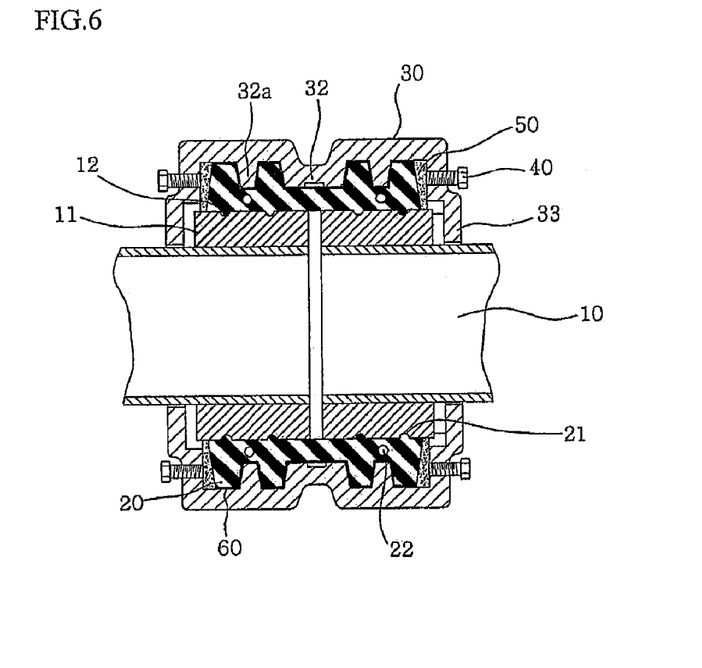
FIG. 6 is a sectional view of the pipe joint device of FIG. 5, which is assembled to joint pipes together.

FIG. 6 shows the pipe joint device of FIG. 5, which is assembled to joint pipes together. To joint pipes 10 together using the pipe joint device, the two flanges 11 are mounted to the ends of the pipes 10, and are fixed to the ends through, for example, a welding process. Thereafter, the ends of the pipes 10 having the flanges 11 are inserted into opposite ends of the packing 20 which is covered with the anti-friction member 60 on the whole area or a part of the outer circumferential surface thereof. In that case, if the packing 20 has the inner rings 21, the position of the packing 20 must be adjusted so that the inner rings 21 are brought into close contact with the ring grooves 12 of the flanges 11. However, if the packing 20 does not have any inner ring 21, positional adjustment of the packing 20 is not necessary. Thereafter, the clamps 30 are placed around the packing 20 with a metal ring 50 interposed between each sidewall of the packing 20 and the inner surfaces of the clamps 30, and are fastened together by the locking members 34, thus jointing the pipes 10 together. The metal ring 50 may be previously mounted to each sidewall of the packing 20 or may be separately produced and placed on each sidewall of the packing 20 before the clamping process. While the clamps 30 are fastened together as described above, the position of the junction of the clamps 30 is preferably adjusted to form a deformed part 24 on a part of the packing 20 on which the anti-friction member 60 is placed. Thus, the pipe jointing work is easily executed. Furthermore, the support sidewalls 33 of the clamps 30 stop the outside ends of the flanges 11 so that the pipes 10 are not undesirably removed from the clamps 30.

When a packing 20 without an inner ring 21 is used, the inner surface of the packing 20 made of a soft material, such as rubber, is elastically deformed to fill the ring grooves 12 of the flanges 11 in response to compression force applied thereto by the fastened clamps 30. In other words, parts of the inner surface of the packing 20 protrude to form protrusions similar to the inner rings 21. Therefore, the operational effect expected from engagement of the ring grooves 12 with the inner rings 21 can be accomplished by a packing 20 without an inner ring 20. Furthermore, when the packing 20 is compressed by the adjusting members 40, the inner rings 21 or protrusions, which are formed on the deformed packing 20 and have a shape similar to the inner rings 21, can more closely engage with the ring grooves 12. The above-mentioned effect is more prominently revealed when the size of the clamps 30 is slightly smaller than the packing 20. However, when the clamps 30 in the above case are fastened together, the deformed part 24 of the packing 20 becomes larger to increase friction. Thus, the anti-friction member 60 must be used in that case.

Figure 7:
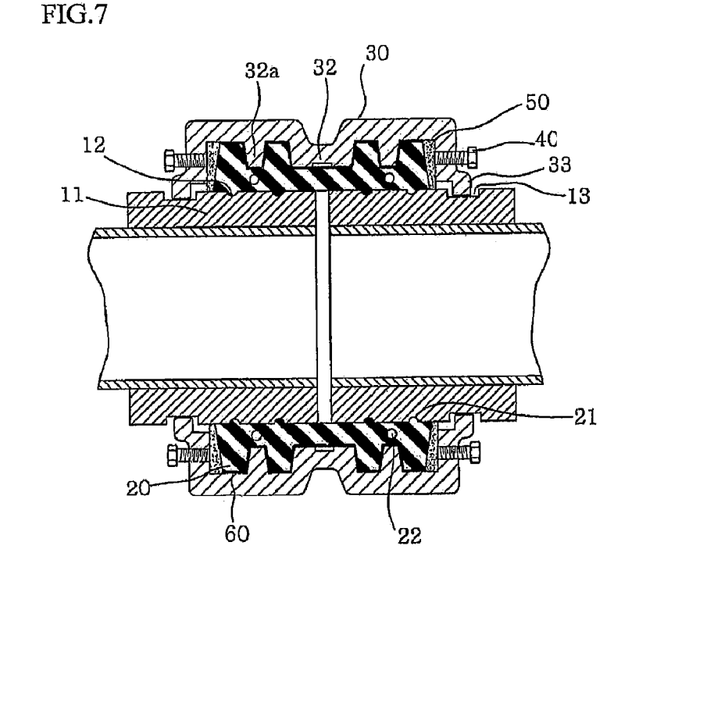
FIG. 7 is a sectional view of a pipe joint device according to a further embodiment of the present invention, which is assembled to joint pipes together.

FIG. 7 shows a pipe joint device according to a further embodiment of the present invention. As shown in the drawing, the general construction and engagement of elements of this embodiment remains the same as the embodiment of FIG. 6, but a ring-shaped support groove 13 is formed around the outer circumferential surface of each flange 11 so that the support sidewalls 33 of the clamps 30 are seated in the ring-shaped support grooves 13 of the flanges 11.

Figure 8:
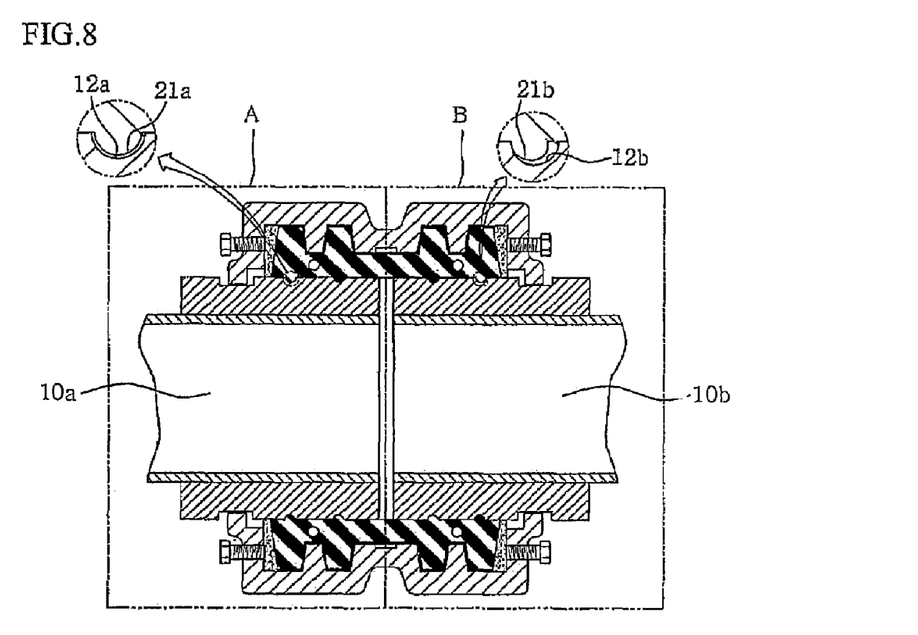
FIG. 8 is a sectional view showing operation of the pipe joint device of FIG. 7 when horizontal force is applied to the jointed pipes.

FIG. 8 shows operation of the pipe joint device of the present invention when horizontal force is applied to the jointed pipes owing to, for example, an earthquake or the pipes are elongated due to temperature variation related to climate change.

When no external force is applied to the pipe joint device of the present invention which joints two pipes 10a and 10b together, the inner rings 21a and 21b and the ring grooves 12a and 12b of the parts A and B of the drawing maintain their engagement while being in close contact with each other throughout the whole surfaces thereof. However, when a leftward force is applied to the right-hand side pipe 10b, the right-hand side pipe 10b and the associated flange move to the right, while the left-hand side pipe 10a and the packing and clamp are maintained in their places. Thus, the inner rings 21b and the ring grooves 12b of the part B are spaced apart from each other, while the inner rings 21a and the ring grooves 12a of the part A maintain their engagement in which the rings 21a and grooves 12a are in close contact with each other throughout the whole surfaces thereof. In a detailed description, in response to the rightward force, the inner rings 21b of the part B are deformed such that each of the inner rings 21b is spaced apart from the right-hand side surface of the associated ring groove 12b while being compressed into the left-hand side surface of the ring groove 12b. Furthermore, the packing has circumferential hollows therein so that the flexibility of the packing is increased to allow the packing to be more easily deformed. In addition, the support sidewalls of the clamps are seated in the ring-shaped support grooves of the flanges, thus preventing the pipes from being removed from the pipe joint device.

When the leftward force is no longer applied to the right-hand side pipe 10b, the pipe 10b elastically moves leftwards to restore its original position owing to the elastic restoring force of the deformed inner rings 21b. The inner rings 21b are brought into close contact with the ring grooves 12b throughout the whole surfaces thereof. As described above, due to the engagement of the inner rings 21a and 21b with the ring grooves 12a and 12b, the pipe joint device of the present invention maintains the jointed state of pipes regardless of an application of horizontal extension or compression force to the pipes. Furthermore, when the external force is no longer applied to the pipes, the pipes are elastically returned to their original positions.

The pipe joint device according to the present invention also operates in a similar manner to maintain the jointed state of pipes regardless of an application of vertical force to the pipes.

When a predetermined lengthy period has passed after jointing pipes together using the pipe joint device of the present invention, elasticity of the inner rings 21 is reduced. Thus, the above-mentioned operational function of the pipe joint device is reduced. In that case, the operational function of the pipe joint device can be restored to some extent by tightening the adjusting members 40.

Figure 9:
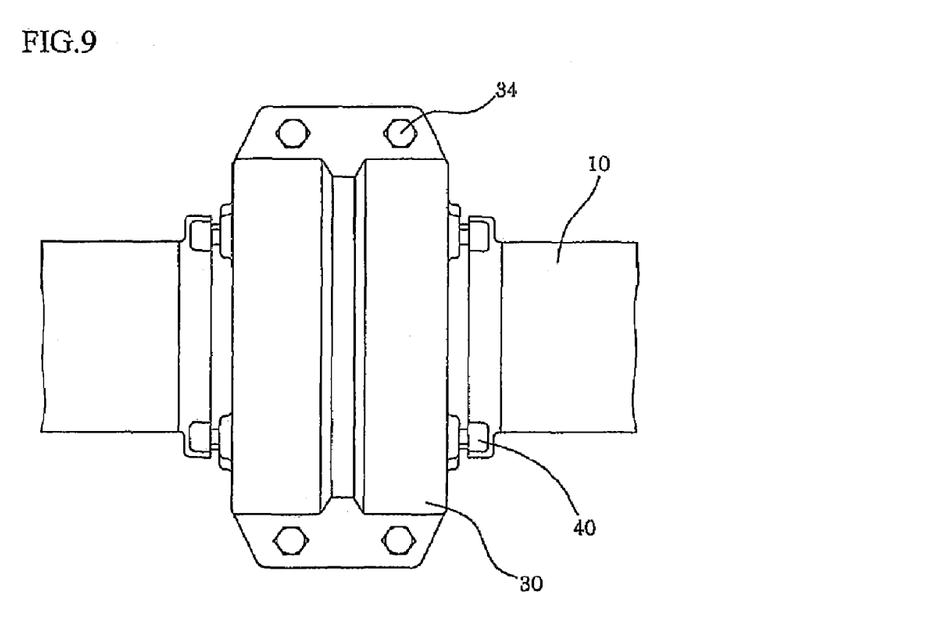
FIG. 9 is a front view of the assembled pipe joint device of FIG. 5.

As shown in FIG. 9, the number of adjusting members 40 may change according to the size of the pipes 10 and other design factors. In the present invention, the adjusting members 40 are preferably mounted on each support sidewall 33 of the clamps 30 at symmetrically opposite positions. Most preferably, eight adjusting members 40 are mounted on the support sidewalls 33 of the clamps 30 such that four adjusting members 40 are mounted on opposite sidewalls of each clamp 30.

Figure 10:
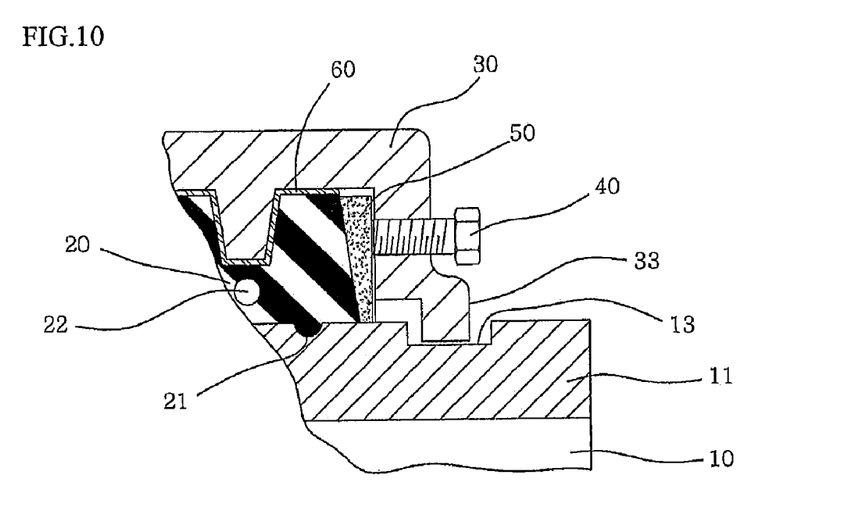
FIG. 10 is an enlarged sectional view of a specified part of the pipe joint device.

FIG. 10 shows a state in which the adjusting members 40 are tightened to compress the packing 20, thus causing the inner rings 21 to come into closer contact with the ring grooves 12. As shown in the drawing, a metal ring 50 is placed between the packing 20 and the adjusting members 40 on each side of the pipe joint device. Due to the metal rings 50, the compression force from the adjusting members 40 is evenly applied to the sidewalls of the packing 20 when the adjusting members 20 are tightened to compress the packing 20. In an effort to accomplish the above-mentioned operation, the metal rings 50 preferably have a shape capable of filling the hollow defined between each sidewall of the packing and the associated support sidewall 33 of the clamps.

As described above, the present invention provides a pipe joint device. To joint pipes together using the pipe joint device of the present invention, a flange having a ring groove is mounted on an end of each pipe, and thereafter, the pipes having the flanges are jointed together using a packing and clamps. Thus, the pipe joint device effectively maintains the jointed state of the pipes regardless of an application of impact to the pipes owing to, for example, an earthquake, or regardless of displacement of the pipes caused by temperature variation due to climate change. The pipe joint device also elastically returns the pipes to their original positions when the external force is removed from the pipes. Thus, the pipe joint device prevents breakage of a jointed junction of pipes and thereby prevents leakage of fluid from the jointed junction.

Furthermore, the packing and clamps have channels and ribs, respectively, so that the clamps more effectively hold the packing. Thus, the operational function caused by engagement of the inner ring of the packing with the ring groove of the flange is enhanced.

The packing has a circumferential hollow therein, thus increasing the flexibility thereof to be more easily deformed and more easily restore its original shape. Due to the circumferential hollow in the packing, the operational function of an adjusting member is enhanced.

Furthermore, it is preferred to shape the packing and the clamps such that the size of the clamps is smaller than the packing so as to allow the inner ring to be in closer contact with the ring groove. In this case, an anti-friction member made of metal and having a smooth surface is preferably used to allow the clamps to be easily fastened together.

In addition, when the operational function of the pipe joint device is reduced due to lengthy use, it is possible to restore the operational function of the pipe joint device to some extent by tightening the adjusting member. When a plurality of adjusting members is provided on the pipe joint device, the above-mentioned effect is enhanced. Furthermore, as a metal ring is provided in the pipe joint device, the compression force can be evenly applied from the adjusting members to the sidewalls of the packing when the adjusting members are tightened to compress the packing.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A pipe joint device, comprising:
   flanges mounted to ends of pipes to be coupled together or ends of both a pipe and a pipe joint to be coupled together, each flange having at least one ring groove around an outer circumferential surface thereof;
   a packing mounted to the flanges and having inner rings protruding from and integrally formed around an inner circumferential surface of the packing to closely engage with the ring grooves of the flanges; and
   a clamp having a packing seat to seat the packing therein, with a support sidewall formed by a radial inward extension of each side of the clamp, the clamp being divided into a plurality of clamp parts so that the clamp parts are placed around the packing and are fastened together by a locking member,
   wherein the packing comprises a main channel formed along a central line of an outer circumferential surface of the packing, and the clamp comprises a central rib formed on the packing seat to correspond to the main channel.

2. The pipe joint device according to claim 1, wherein the packing further comprises at least one side channel symmetrically formed around the outer circumferential surface of the packing on opposite sides of the main channel, and the clamp further comprises at least one side rib formed on the packing seat to correspond to the side channels.

3. A pipe joint device comprising:
   flanges mounted to ends of pipes to be coupled together or ends of both a pipe and a pipe joint to be coupled together, each flange having at least one ring groove around an outer circumferential surface thereof;
   a packing mounted to the flanges and having inner rings protruding from and integrally formed around an inner circumferential surface of the packing to closely engage with the ring grooves of the flanges; and
   a clamp having a packing seat to seat the packing therein, with a support sidewall formed by a radial inward extension of each side of the clamp, the clamp being divided into a plurality of clamp parts so that the clamp parts are placed around the packing and are fastened together by a locking member,
   wherein each of the flanges is provided with a support groove around the outer circumferential surface thereof so that the support sidewalls of the clamp are seated in ring-shaped support grooves of the flanges to prevent the pipes or the pipe and the pipe joint from being removed from the clamp.

4. A pipe joint device comprising:
   flanges mounted to ends of pipes to be coupled together or ends of both a pipe and a pipe joint to be coupled together, each flange having at least one ring groove around an outer circumferential surface thereof;
   a packing mounted to the flanges and having inner rings protruding from and integrally formed around an inner circumferential surface of the packing to closely engage with the ring grooves of the flanges;
   a clamp having a packing seat to seat the packing therein, with a support sidewall formed by a radial inward extension of each side of the clamp, the clamp being divided into a plurality of clamp parts so that the clamp parts are placed around the packing and are fastened together by a locking member; and
   an anti-friction member made of metal located on at least a part of the outer circumferential surface of the packing so as to reduce friction between the clamp parts and a deformed part of the packing when the clamp parts are fastened together around the packing.

5. A pipe joint device comprising:
   flanges mounted to ends of pipes to be coupled together or ends of both a pipe and a pipe joint to be coupled together, each flange having at least one ring groove around an outer circumferential surface thereof;
   a packing mounted to the flanges and having inner rings protruding from and integrally formed around an inner circumferential surface of the packing to closely engage with the ring grooves of the flanges;
   a clamp having a packing seat to seat the packing therein, with a support sidewall formed by a radial inward extension of each side of the clamp, the clamp being divided into a plurality of clamp parts so that the clamp parts are placed around the packing and are fastened together by a locking member; and
   an adjusting member inserted into each of the support sidewalls of the clamp to compress the packing, placed between the support sidewalls of the clamp, in a direction of thickness of the packing.

6. The pipe joint device according to claim 5, further comprising:
   a metal ring placed between each side surface of the packing and an associated support sidewall of the clamp so as to evenly transmit compression force to each side surface of the packing when the adjusting member is tightened to compress the packing.

7. A pipe joint device, comprising:
   flanges mounted to ends of pipes to be coupled together or ends of both a pipe and a pipe joint to be coupled together, each flange having at least one ring groove around an outer circumferential surface thereof;

a packing mounted to the flanges and having inner rings around an inner circumferential surface thereof to closely engage with the ring grooves of the flanges; and a clamp having a packing seat to seat the packing therein, with a support sidewall formed by a radial inward extension of each side of the clamp, the clamp being divided into a plurality of clamp parts so that the clamp parts are placed around the packing and are fastened together by a locking member, wherein the packing comprises a main channel formed along a central line of an outer circumferential surface of the packing, and the clamp comprises a central rib formed on the packing seat to correspond to the main channel.

8. The pipe joint device according to claim 7, wherein the packing further comprises at least one side channel symmetrically formed around the outer circumferential surface of the packing on opposite sides of the main channel, and the clamp further comprises at least one side rib formed on the packing seat to correspond to the side channels.

9. A pipe joint device, comprising:

flanges mounted to ends of pipes to be coupled together or ends of both a pipe and a pipe joint to be coupled together, each flange having at least one ring groove around an outer circumferential surface thereof;

a packing mounted to the flanges and having inner rings around an inner circumferential surface thereof to closely engage with the ring grooves of the flanges; and a clamp having a packing seat to seat the packing therein, with a support sidewall formed by a radial inward extension of each side of the clamp, the clamp being divided into a plurality of clamp parts so that the clamp parts are placed around the packing and are fastened together by a locking member, wherein each of the flanges is provided with a support groove around the outer circumferential surface thereof so that the support sidewalls of the clamp are seated in ring-shaped support grooves of the flanges to prevent the pipes or the pipe and the pipe joint from being removed from the clamp.

10. A pipe joint device, comprising:

flanges mounted to ends of pipes to be coupled together or ends of both a pipe and a pipe joint to be coupled together, each flange having at least one ring groove around an outer circumferential surface thereof;

a packing mounted to the flanges and having inner rings around an inner circumferential surface thereof to closely engage with the ring grooves of the flanges;

a clamp having a packing seat to seat the packing therein, with a support sidewall formed by a radial inward extension of each side of the clamp, the clamp being divided into a plurality of clamp parts so that the clamp parts are placed around the packing and are fastened together by a locking member; and an anti-friction member made of metal located on at least a part of the outer circumferential surface of the packing so as to reduce friction between the clamp parts and a deformed part of the packing when the clamp parts are fastened together around the packing.

11. A pipe joint device, comprising:

flanges mounted to ends of pipes to be coupled together or ends of both a pipe and a pipe joint to be coupled together, each flange having at least one ring groove around an outer circumferential surface thereof;

a packing mounted to the flanges and having inner rings around an inner circumferential surface thereof to closely engage with the ring grooves of the flanges;

a clamp having a packing seat to seat the packing therein, with a support sidewall formed by a radial inward extension of each side of the clamp, the clamp being divided into a plurality of clamp parts so that the clamp parts are placed around the packing and are fastened together by a locking member; and an adjusting member inserted into each of the support sidewalls of the clamp to compress the packing, placed between the support sidewalls of the clamp, in a direction of thickness of the packing.

12. The pipe joint device according to claim 11, further comprising:

a metal ring placed between each side surface of the packing and an associated support sidewall of the clamp so as to evenly transmit compression force to each side surface of the packing when the adjusting member is tightened to compress the packing.

* * * * *